United States Patent Office
3,475,465
Patented Oct. 28, 1969

3,475,465
PROCESS FOR THE PREPARATION OF $\Delta^{5(10)}$-3-KETO-19-NOR-STEROIDS
Max Solomon de Winter, Oss, and Elze Anjo Harryvan, Culemborg, Netherlands, assignors to Organon Inc., West Orange, N.J., a corporation of New Jersey
No Drawing. Filed June 15, 1967, Ser. No. 646,191
Claims priority, application Netherlands, June 24, 1966, 6608779
Int. Cl. C07c 167/00, 169/10
U.S. Cl. 260—397.4     3 Claims

ABSTRACT OF THE DISCLOSURE

The present invention relates to a novel process for the preparation of $\Delta^{5(10)}$-3-keto-steroids starting from $\Delta^4$-3,19-dioxo-steroids and treating the latter with a base such as a metal alcoholate or a metal amide in the presence of liquid ammonia.

A special performance of the process according to the invention is the conversion of a $\Delta^4$-3,17,19-trioxoandrostene into a $\Delta^{5(10)}$-3-keto-17$\beta$-hydroxy-17$\alpha$-ethynyl-oestrene using an alkali metal acetylide as a base.

---

The invention relates to a new process for the preparation of $\Delta^{5(10)}$-3-keto-19-nor-steroids.

To the group of $\Delta^{5(10)}$-3-keto-19-nor-steroids belong very important biology active substances, including compounds having oestrogenic, progestational and ovulation-inhibiting properties. A known compound having the latter property is the $\Delta^{5(10)}$-3-keto-17$\beta$-hydroxy-17$\alpha$-ethynyl-oestrene.

To the group of $\Delta^{5(10)}$-3-keto-19-nor-steroids belong very important biology active substances, including compounds having oestrogenic, progestational ovulation-inhibiting properties. A known compound having the latter property is the $\Delta^{5(10)}$-3-keto-17$\beta$-hydroxy-17$\alpha$-ethynyl-oestrene.

A known method for the preparation of said group of compounds consists in that a 3-alkyloxy-substituted steroid, for example oestradiol-3-methylether, is reduced by means of an alkali metal in liquid ammonia, whereupon the $\Delta^{2,5(10)}$-3-alkyloxy-oestradiene compound so obtained is treated with a weak acid, for example oxalic acid, to obtain the desired $\Delta^{5(10)}$-3-keto-19-nor-steroid compound.

If the $\Delta^{2,5(10)}$-3-alkyloxy-oestratriene compound mentioned before is treated with a strong acid a $\Delta^4$-3-keto-19-nor-steroid compound is obtained instead of a $\Delta^{5(10)}$-3-keto-19-nor-steroid compound. The former compound can also be obtained by treating a $\Delta^{5(10)}$-3-keto-19-nor-steroid compound with an acid or base. Besides these known methods for the preparation of $\Delta^4$-3-keto-19-nor-steroid compounds another method was developed a few years ago, starting from a $\Delta^5$-3-acyloxy-steroid compound, which via the 5$\alpha$-bromo-6$\beta$-hydroxy compound and the $\Delta^4$-3-keto-6,19-oxido-steroid compound prepared therefrom yields after reduction with zinc and oxidation of the resulting 19-hydroxy compound a $\Delta^4$-3,19-dioxo-(10-formyl)-steroid. The 10-formyl group is split off by treatment with a base to obtain a $\Delta^4$-3-keto-19-nor-steroid compound.

Various attempts have been made to employ $\Delta^4$-3,19-dioxo-steroids, which, as described before, are used for the synthesis of $\Delta^4$-3-keto-19-nor-steroids, also as intermediate products for the likewise important group of $\Delta^{5(10)}$-3-keto-19-nor-steroids. But these attempts, in which a large number of bases were applied in combination with several solvents, invariably yielded $\Delta^4$-3-keto-19-nor-steroids, in which under certain conditions the 10-formyl group shifted to carbon atom 2 of the steroid molecule.

Surprisingly it has now been found that $\Delta^4$-3,19-dioxo-steroids can yet be converted into $\Delta^{5(10)}$-3-keto-19-nor-steroids by treatment with a base, if this reaction is performed in the presence of liquid ammonia.

The starting products to be used in the present process may belong to the androstane, pregnane, chloane, furostane or other series, and may be both homo and nor-steroids, including 18-nor and 18-homo-steroids. Further they may be substituted elsewhere in the molecule by one or more alkali resistant groups.

An important group of starting products are the $\Delta^4$-3,19-dioxo-steroids of the androstant and pregnane series on account of the compounds obtained from them.

The bases to be used in the present process include, for example, the metal salts of organic carboxylic acids, especially those of the lower aliphatic carboxylic acids, such as potassium acetate or sodium propionate, metal amides, metal alkoxides such as potassium methanolate, sodium ethanolate, magnesium methanolate, magnesium ethanolate, potassium isopropylate, sodium or potassium t-butylate or aluminum isopropylate, and metal hydrides.

It is preferred to employ metal amides, such as the potassium metal amides or metal alkoxides, especially metal isopropylates or magnesium alcoholates (alkoxides), as base.

The process is usually performed by adding the steroid to a mixture of liquid ammonia and the base employed, whether or not incorporated in an organic liquid in a dissolved or suspended state. The mixture so obtained is then set aside for some time, usually ranging from a few minutes to a few hours, during which period stirring may take place, if desired, after which the reaction mixture is decomposed by adding an acid which is strong in an ammoniacal medium, whereupon the $\Delta^{5(10)}$-3-keto-19-nor-steroid compound may be isolated in the conventional manner. The quantities of liquid ammonia and base are not tied to strict limits, but they usually amount to 15 to 100 parts by volume of ammonia per part by volume of steroid, the base being employed in a quantity of at least two equivalents calculated on the metal.

The acids to be used for the decomposition may include, for example, alcohols and ammonium salts, the latter group of which is preferred because these salts keep the reaction mixture neutral, also during the further process. It is preferred to employ ammonium salts derived from a strong acid, such as hydrogen halides, sulphuric acid or phosphoric acid. These ammonium salts are usually added to the ammoniacal reaction mixture, whether or not in a dissolved or suspended state, but they may also be prepared in situ by adding the relative acid gently to the ammonia mixture. A special execution method of the process according to the invention consists in that the starting material used is a $\Delta^4$-3,17,19-trioxoandrostene compound, an alkali metal acetylide, preferably potassium acetylide, being employed as base. Not only is the 10-formyl group split off and the $\Delta^4$-bond isomerized to obtain the desired $\Delta^{5(10)}$-3-keto-oestrene compound, but there simultaneously occurs a selective ethinylation at the 17-position, through which it is possible to obtain in one reaction step, starting from a compound of the androstane series, a $\Delta^{5(10)}$-3-keto-17$\beta$-hydroxy-17$\alpha$-ethinyl-oestrene compound, including the biologically active $\Delta^{5(10)}$-3-keto-17$\beta$-hydroxy-17$\alpha$-ethynyl-oestrene and the likewise very important $\Delta^{5(10)}$-3-keto-7$\alpha$-methyl - 17$\beta$ - hydroxy-17$\alpha$-ethynyl-oestrene.

The invention is illustrated further by the following examples.

EXAMPLE I

Potassium (2.5 gm.) is dissolved in dry, liquid ammonia (125 ml.). The potassium is converted into potassium amide with a catalytic quality of ferrinitrate. The blue solution turns grey.

To this solution are added 5 gm. of 3,17,19-trioxo-$\Delta^4$-androstene. The reaction mixture is stirred for 5 minutes. After the addition of 8 mg. of ammonium chloride it is stirred for another 5 minutes. Finally the reaction mixture is poured into 1100 ml. of ice-water. The precipitated 3,17 - dioxo - $\Delta^{5(10)}$-oestrene is filtered off, washed with water until neutral and dried. Yield: 3.9 gm. M.P.: 138–140° C.

If sodium or lithium is employed instead of potsssium a somewhat lower yield is obtained.

EXAMPLE II

Ten gm. of potassium are dissolved in 1000 ml. of dry, liquid ammonia, after which acetylene is bubbled through the blue solution till it is discoloured. Then a suspension is added of 20 gm. of 3,17,19-trioxo-$\Delta^4$-androstene in 100 ml. of dry ether and acetylene is bubbled through the mixture for 4 hours. Next 40 gm. of ammonium chloride are added, whereupon the mixture is stirred for 5 minutes. The reaction mixture is then poured into 8000 ml. of ice water. The crystalline 3-keto - 17$\alpha$ - ethynyl - 17$\beta$ - hydroxy - $\Delta^{5(10)}$ - oestrene is sucked off, washed with water until neutral and dried in vacuo at 50° C. The crude product is recrystallised from acetone with one drop of pyridin. Yield: 10 gm. M.P.: 168–172° C.

By the process described above the $\Delta^4$-3,17,19-trioxo-7$\alpha$-methyl-androstene has been converted into the $\Delta^{5(10)}$-3 - keto - 7$\alpha$ - methyl - 17$\beta$ - hydroxy - 17$\alpha$ - ethynyl-oestrene having a melting point of 165–169° C.

EXAMPLE III

Potassium (2.5 mg.) is dissolved in dry, liquid ammonia (125 ml.). To the blue solution are added 5 gm. of propanol-2. After 1 hour the solution is discoloured. Then 5 gm. of 3,19,20-trioxo-$\Delta^4$-pregnene are added. After stirring for 10 minutes 8 gm. of ammonium chloride are added and the mixture is stirred for another 5 minutes. The reaction mixture is then poured on to 17 gm. of ice. After stirring for some time the resulting 3,20-diketo-$\Delta^{5(10)}$-19-nor-pregnene is sucked off, washed with water until neutral and dried. The dried product is recrystallised from ether. Yield. 3.2 gm. M.P.: 95–96°.

EXAMPLE IV

One gm. of lithium is dissolved in 200 ml. of dry, liquid ammonia. The blue solution is discoloured with a crystalline ferrinitrate. To the resulting grey solution are added 6 gm. of 3,19-dioxo-17$\alpha$-methyl-17$\beta$-hydroxy-$\Delta^4$-androstene. After stirring the mixture for 5 minutes 10 gm. of ammonium chloride are added and the mixture is stirred for another 5 minutes. After evaporating the ammonia the residue is taken up in ether. The ether solution is washed with water until neutral and dried on $Na_2SO_4$. The ether is distilled off and the residue crystallised from ether with one drop of pyridin. Yield: 2.8 gm. of 3-keto-17$\alpha$-methyl-17$\beta$-hydroxy-$\Delta^{5(10)}$-oestrene having a melting point of 145–146° C.

If an equivalent quantity of ammonium sulphate or ammonium phosphate is employed instead of ammonium chloride the desired $\Delta^{5(10)}$-3-keto compound is also obtained in a yield of from 2.8 to 3.15 gm.

EXAMPLE V 40.0 g. of powdered 3,17-dioxo-7$\alpha$-methyl-$\Delta^4$-androstene-19-al are added to a suspension of 8 g. of magnesiummmethoxide in 1 l. of liquid $NH_3$. The reaction mixture is stirred at —33° C. for one hour and then 40 g. of $NH_4CL$ are added carefully. The reaction mixture is concentrated under nitrogen to about 500 ml. and subsequently poured out in 2 l. of ice. The aqueous mixture is filtered. The filtercake is suspended in 400 ml. of methylene-chloride containing 1% of pyridine. After filtering over supercell the filterate is washed with water until neutral, dried and evaporated under reduced pressure. Crystallization from acetone-hexane yielded 24 g. of 7$\alpha$-methyl-$\Delta^{5(10)}$-estren-3,17-dione. M.P.: 111–113° C.; $[\alpha]_D = +235$ (chloroform).

We claim:

1. Process for the preparation of a $\Delta^{5(10)}$-3-keto-19-norsteroid which comprises the steps of reacting a $\Delta^4$-13,19-dioxo-steroid in the presence of liquid ammonia with a compound selected from the group consisting of a metal salt of a lower aliphatic carboxylic acid, a metal alkoxide, a metal amide, a metal hydride, and an alkali metal acetylide, and then decomposing the reaction mixture with an ammonium salt of a strong acid.

2. The process of claim 1 in which the metal alkoxide is a magnesium alcoholate.

3. The process of claim 1 in which the starting material is a $\Delta^4$-3,17,19-trioxo-androstene compound, a reacting compound is an alkali metal acetylide, and the compound obtained is a $\Delta^{5(10)}$ - 3 - keto - 17$\beta$-hydroxy-17$\alpha$-ethinyl-oestrene compound.

References Cited

UNITED STATES PATENTS 3,014,931  12/1961  Nishikawa et al. ___ 260—397.1

OTHER REFERENCES

Poel et al., Chimia, Apr. 20, 1966, pp. 110–113.

LEWIS GOTTS, Primary Examiner

ETHEL G. LOVE, Assistant Examiner

U.S. Cl. X.R.

260—397.3